(12) United States Patent
Gevik

(10) Patent No.: US 12,203,580 B2
(45) Date of Patent: *Jan. 21, 2025

(54) HYDRO-VAC FITTING

(71) Applicant: EMCO, Inc., Maple Grove, MN (US)

(72) Inventor: Glenn Gevik, Maple Grove, MN (US)

(73) Assignee: EMCO, INC., Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,494

(22) Filed: Sep. 14, 2023

(65) Prior Publication Data

US 2024/0003477 A1 Jan. 4, 2024

Related U.S. Application Data

(63) Continuation of application No. 16/833,129, filed on Mar. 27, 2020, now Pat. No. 11,796,112.

(Continued)

(51) Int. Cl.
| | |
|---|---|
| *F16L 43/00* | (2006.01) |
| *E02F 3/88* | (2006.01) |
| *E02F 3/90* | (2006.01) |
| *E02F 3/92* | (2006.01) |
| *E02F 7/10* | (2006.01) |
| *F16L 23/12* | (2006.01) |

(Continued)

(52) U.S. Cl.
CPC .......... *F16L 43/001* (2013.01); *E02F 3/8816* (2013.01); *E02F 3/90* (2013.01); *E02F 3/9243* (2013.01); *E02F 7/10* (2013.01); *F16L 23/125* (2013.01); *F16L 57/005* (2013.01); *F16L 57/06* (2013.01)

(58) Field of Classification Search
CPC ....... F16L 43/001; F16L 23/125; F16L 57/06; E02F 3/8816; E02F 3/90
See application file for complete search history.

(56) References Cited

U.S. PATENT DOCUMENTS

| | | |
|---|---|---|
| 3,794,359 A | 2/1974 | Fischer |
| 4,165,245 A | 8/1979 | Ludwig |

(Continued)

OTHER PUBLICATIONS

"U.S. Appl. No. 16/833,063, Corrected Notice of Allowability mailed Feb. 1, 2023", 2 pgs.

(Continued)

*Primary Examiner* — David Bochna
(74) *Attorney, Agent, or Firm* — SCHWEGMAN LUNDBERG & WOESSNER, P.A.

(57) ABSTRACT

An elbow fitting for an excavating apparatus can include a curved cylindrical pipe that can include a first metal material. In an example, the fitting can be configured for coupling to a hose. The pipe can include an interior surface and an exterior surface. Optionally, a perimeter of the pipe does not exceed a diameter of a first end of the pipe. The fitting can include a cladding layer (e.g., a second metal material) that can be coupled to the first metal material within the interior surface of the pipe. The cladding layer can include an abrasion-resistant material. The cladding layer can be coupled to the pipe such as with a welding operation. The cladding layer can include one or more ridges. The cladding layer can corregate the interior surface of the fitting and exterior surfaces of the fitting which can come into contact with abrasive material.

19 Claims, 10 Drawing Sheets

Related U.S. Application Data

(60) Provisional application No. 62/826,264, filed on Mar. 29, 2019.

(51) Int. Cl.
*F16L 57/00* (2006.01)
*F16L 57/06* (2006.01)

(56) References Cited

U.S. PATENT DOCUMENTS

| | | | |
|---|---|---|---|
| 4,447,076 | A | 5/1984 | Evans |
| 4,621,953 | A | 11/1986 | Mcguth |
| 4,633,913 | A | 1/1987 | Carty et al. |
| 4,865,353 | A | 9/1989 | Osborne |
| 5,288,111 | A | 2/1994 | Storf et al. |
| 5,301,984 | A | 4/1994 | Farris |
| 5,718,461 | A | 2/1998 | Esser |
| 6,467,812 | B1 | 10/2002 | Klemm et al. |
| 11,614,193 | B2 * | 3/2023 | Gevik .................. F16L 43/001 137/377 |
| 11,796,112 | B2 * | 10/2023 | Gevik .................. F16L 43/001 |
| 2008/0169642 | A1 | 7/2008 | Yang et al. |
| 2010/0187287 | A1 | 7/2010 | Greenwall |
| 2013/0098405 | A1 | 4/2013 | Boltus |
| 2014/0017018 | A1 | 1/2014 | Blais et al. |
| 2014/0216593 | A1 | 8/2014 | Lenes |
| 2014/0261556 | A1 | 9/2014 | Martin et al. |
| 2014/0283942 | A1 | 9/2014 | Ferre et al. |
| 2015/0285425 | A1 * | 10/2015 | Hinton .................. F16L 57/06 138/172 |
| 2020/0063908 | A1 | 2/2020 | Fink |
| 2020/0309296 | A1 | 10/2020 | Gevik |
| 2020/0309304 | A1 | 10/2020 | Gevik |
| 2021/0164602 | A1 | 6/2021 | Luig et al. |
| 2023/0220938 | A1 | 7/2023 | Gevik |

OTHER PUBLICATIONS

"U.S. Appl. No. 16/833,063, Examiner Interview Summary mailed Jul. 19, 2022", 3 pgs.
"U.S. Appl. No. 16/833,063, Examiner Interview Summary mailed Dec. 7, 2022", 2 pgs.
"U.S. Appl. No. 16/833,063, Final Office Action mailed Nov. 3, 2022", 15 pgs.
"U.S. Appl. No. 16/833,063, Non Final Office Action mailed May 18, 2022", 15 pgs.
"U.S. Appl. No. 16/833,063, Notice of Allowance mailed Jan. 19, 2023", 5 pgs.
"U.S. Appl. No. 16/833,063, Response filed Aug. 1, 2022 to Non Final Office Action mailed May 18, 2022", 17 pgs.
"U.S. Appl. No. 16/833,063, Response filed Dec. 15, 2022 to Final Office Action mailed Nov. 3, 2022", 13 pgs.
"U.S. Appl. No. 16/833,129, Corrected Notice of Allowability mailed Sep. 11, 2023", 3 pgs.
"U.S. Appl. No. 16/833,129, Examiner Interview Summary mailed Apr. 24, 2023", 2 pgs.
"U.S. Appl. No. 16/833,129, Examiner Interview Summary mailed Jul. 19, 2022", 3 pgs.
"U.S. Appl. No. 16/833,129, Final Office Action mailed Aug. 9, 2023", 8 pgs.
"U.S. Appl. No. 16/833,129, Non Final Office Action mailed Feb. 22, 2023", 11 pgs.
"U.S. Appl. No. 16/833,129, Non Final Office Action mailed May 9, 2022", 13 pgs.
"U.S. Appl. No. 16/833,129, Non Final Office Action mailed Nov. 4, 2022", 13 pgs.
"U.S. Appl. No. 16/833,129, Notice of Allowance mailed Aug. 30, 2023 U.S. Appl. No. 16/833,129, Notice of Allowance mailed Aug. 30, 2023", 6 pgs.
"U.S. Appl. No. 16/833,129, Response filed May 4, 2023 to Non Final Office Action mailed Feb. 22, 2023", 13 pgs.
"U.S. Appl. No. 16/833,129, Response filed Aug. 1, 2022 to Non Final Office Action mailed May 9, 2022", 15 pgs.
"U.S. Appl. No. 16/833,129, Response filed Aug. 21, 2023 to Final Office Action mailed Aug. 9, 2023", 7 pgs.
"U.S. Appl. No. 16/833,129, Response filed Dec. 15, 2022 to Non Final Office Action mailed Nov. 4, 2022", 11 pgs.
"Baghouse silo sweeping elbow with longer service life", Hardox Wearparts [online]. [retrieved Aug. 25, 2020]. Retrieved from the Internet: <URL: https://www.hardoxwearparts.com/ssab-cases/baghouse-silo-sweeping-elbow-with-longer-service-life>, (2020), 3 pgs.
"Ceramic Lined Products", Vac Truck Store [online]. Reviewed from the Internet: <URL: https://vactruckstore.com/product-category/ceramic-lined-products/, (published prior to Mar. 27, 2020), 5 pgs.
"How to Control the Warping of Parts in Thin Sheet Metal", Fabricating and Metal Working, [Online]. Retrieved from the Internet: <URL: https://www.fabricatingandmetalworking.com/2013/02/how-to-control-the-warping-of-parts-in-thin-sheet-metal/>, (Feb. 8, 2013), 4 pgs.
"Sewer Equipment Co. of America Full Line Catalog", Part No. 92942-00-X, Rev. Apr. 2020, (Apr. 2020), 100 pgs.
"SSAB Wear Resistant Steel Tubes", Hardox Tubes, (2016), 15 pgs.
"Vac.Con Parts and Accessories Catalog", Vac-Con, Inc., Green Cove Springs, FL 32043, (Dec. 2011), 64 pgs.
"U.S. Appl. No. 18/182,966, Non Final Office Action mailed Jul. 14, 2023", 12 pages.

* cited by examiner

HYDRO-VAC FITTING

CLAIM OF PRIORITY

This patent application is a continuation of U.S. patent application Ser. No. 16/833,129, filed Mar. 27, 2020, which claims the benefit of priority of U.S. Provisional Patent Application Ser. No. 62/826,264, entitled "HYDRO-VAC," filed on March 29, which applications are hereby incorporated by reference herein in their entirety.

TECHNICAL FIELD

This document pertains generally, but not by way of limitation, to fittings for excavating equipment, for example a hydro-vac apparatus.

BACKGROUND

Earthen material (e.g., dirt, mud, sand, rock or the like) can be excavated to remove the material from an area, for example to excavate the material from an area proximate to utility (e.g., electrical, natural gas, water, sewer, telecommunications, or the like) lines. For instance, a hydro-vac apparatus can discharge water and dilute the earthen material into a slurry. The slurry can be drawn (e.g., vacuumed, sucked, removed, transmitted, or the like) into a nozzle, and through a hose into a container. The slurry can wear (e.g., erode, abrade, grind, or the like) components of the hydro-vac apparatus.

SUMMARY

The present inventor has recognized, among other things, that a problem to be solved can include reducing the amount of wear experienced by components of an excavating apparatus (e.g., a hydro-vac apparatus). The present inventors have recognized, among other things, that a problem to be solved can include reducing the rate of replacing components of the excavating apparatus.

The present subject matter can help provide a solution to this problem, such as by providing a fitting for an excavating apparatus, for example a hydro-vac apparatus. The fitting can be configured for insertion into a hose (e.g., the hose can receive the fitting). The fitting can couple with other fittings of the excavating apparatus, for instance an elbow or the like.

The fitting can include a cylindrical pipe that can include a first metal material. The pipe can include a first end and a second end. The pipe can include an interior surface, and the interior surface can define a cavity. The pipe can include an exterior surface, and the exterior surface can define a perimeter of the pipe. Optionally, the perimeter of the pipe does not exceed a diameter of the first end. The pipe can define a groove, and the groove can extend into the exterior surface of the pipe. The groove can be configured to engage with a clamp. The clamp can be configured to couple the hose with the pipe. For instance, the hose can be located between the pipe and the clamp, and the clamp can compress the hose against the pipe (e.g., to secure the hose to the pipe). The fitting can include a flange, and the flange can be coupled to the second end of the cylindrical pipe. The fitting can include a cladding layer that can be coupled to the interior surface of the pipe. The cladding layer can include an abrasion-resistant material.

The cladding layer can help improve the resilience of the fitting, for example to help reduce (e.g., slow, minimize, inhibit, or the like) the rate of wear caused by a slurry flowing through the fitting. The fitting can help improve the lifespan of the fitting because the resilience of the fitting can be improved by the cladding layer. The fitting can have improved safety because the resilience of the fitting can be improved, for example the safety can be improved by preventing the fitting from failing (e.g., rupturing, cracking splitting, or the like).

In some prior approaches of pipe cladding, a cladding layer is added to include a corrosion-resistant material. The corrosion-resistant material can resist corrosion caused by a petroleum product (e.g., oil, natural gas, or the like) flowing through the pipe. However, the corrosion-resistant material does not have abrasion-resistant properties, and accordingly the corrosion resistant-material can wear from earthen material. Accordingly, the present configurations which include an abrasion-resistant material in the cladding layer can help reduce wearing of the fitting and improve the resilience of the fitting.

Aspect 1 can include or use subject matter (such as an apparatus, a system, a device, a method, a means for performing acts, or a device readable medium including instructions that, when performed by the device, can cause the device to perform acts), such as can include or use an elbow fitting for a hydro-vac apparatus, comprising: a curved cylindrical pipe including a first metal material and configured for insertion into a hose, the pipe including: a first end; a second end; an interior surface defining a cavity; an exterior surface, the exterior surface defining a perimeter of the pipe, wherein the perimeter of the pipe does not exceed a diameter of the first end; and a groove extending into the exterior surface of the pipe and configured to engage with a clamp, wherein the clamp is configured to couple the hose with the pipe; a flange coupled to the second end of the curved cylindrical pipe; and a cladding layer coupled to the interior surface of the pipe, wherein the cladding layer includes an abrasion-resistant metal material.

Aspect 2 can include or use, or can optionally be combined with the subject matter of Aspect 1, to optionally include or use wherein the cladding layer includes a plurality of ridges that extend into the cavity, and the plurality of ridges includes a first ridge and a second ridge.

Aspect 3 can include or use, or can optionally be combined with the subject matter of Aspect 2 to optionally include or use wherein the first ridge is abutted against the second ridge.

Aspect 4 can include or use, or can optionally be combined with the subject matter of one or any combination of Aspects 2 or 3 to optionally include or use wherein the first ridge and the second ridge are continuous around the interior surface of the pipe.

Aspect 5 can include or use, or can optionally be combined with the subject matter of one or any combination of Aspects 2 through 4 to optionally include or use wherein the fitting includes a flow axis that extends from the first end to the second end of the pipe, and the first ridge and the second ridge extend into the cavity and perpendicular to the flow axis.

Aspect 6 can include or use, or can optionally be combined with the subject matter of one or any combination of Aspects 2 through 5 to optionally include or use wherein the plurality of ridges are configured to corrugate the interior surface of the pipe.

Aspect 7 can include or use, or can optionally be combined with the subject matter of one or any combination of Aspects 2 through 6 to optionally include or use a third ridge, wherein: the third ridge is coupled to the first ridge and the second ridge; the third ridge is located between the first ridge and the second ridge; and the first ridge extends into the cavity at a first distance and the third ridge extends into the cavity at a second distance, wherein the second distance is greater than the first distance.

Aspect 8 can include or use, or can optionally be combined with the subject matter of one or any combination of Aspects 1 through 7 to optionally include or use wherein: the second end of the pipe includes an end surface that is perpendicular to the interior surface of the pipe; and the cladding layer is coupled to the end surface of the pipe.

Aspect 9 can include or use, or can optionally be combined with the subject matter of one or any combination of Aspects 1 through 8 to optionally include or use wherein a first end of the curved cylindrical pipe is offset at an angle with respect to a second end of the curved cylindrical pipe.

Aspect 10 can include or use, or can optionally be combined with the subject matter of one or any combination of Aspects 1 through 9 to optionally include or use wherein a first flange is coupled to the first end of the curved cylindrical pipe and a second flange is coupled to the second end of the curved cylindrical pipe.

Aspect 11 can include or use, or can optionally be combined with the subject matter of one or any combination of Aspects 1 through 10 to optionally include or use wherein the abrasion-resistant material includes one or more of tungsten, chromium carbide, or niobium.

Aspect 12 can include or use, or can optionally be combined with the subject matter of one or any combination of Aspects 1 through 11 to optionally include or use wherein the groove is positioned proximate to a center section of the pipe.

Aspect 13 can include or use, or can optionally be combined with the subject matter of one or any combination of Aspects 1 through 12 to optionally include or use wherein the flange includes at least one through-hole configured to receive a fastener to couple the fitting with a nozzle.

Aspect 14 can include or use, or can optionally be combined with the subject matter of one or any combination of Aspects 1 through 13 to optionally include or use wherein the diameter of the pipe is 12 inches or less.

Aspect 15 can include or use, or can optionally be combined with the subject matter of one or any combination of Aspects 1 through 14 to optionally include or use wherein a thickness of a wall of the pipe is within a range of approximately 0.125 inches and 0.250 inches.

Aspect 16 can include or use, or can optionally be combined with the subject matter of one or any combination of Aspects 1 through 15 to optionally include or use wherein a thickness of the cladding layer is within a range of approximately 0.1 inches and 0.250 inches.

Aspect 17 can include or use, or can optionally be combined with the subject matter of one or any combination of Aspects 1 through 13 to optionally include or use wherein the cladding layer penetrates into the interior surface.

Aspect 18 can include or use subject matter (such as an apparatus, a system, a device, a method, a means for performing acts, or a device readable medium including instructions that, when performed by the device, can cause the device to perform acts), such as can include or use a hydro-vac apparatus, comprising: a hose configured to transport excavated material; a vacuum pump configured to apply a suction force to the hose; and a first fitting configured to couple with a nozzle, including: a cylindrical pipe including a first metal material, the pipe including: a first end; a second end; an interior surface defining a cavity; an exterior surface, the exterior surface defining a perimeter of the pipe and the perimeter of the pipe does not exceed a diameter of the first end; a groove extending into the exterior surface of the pipe and configured to engage with a clamp, wherein the clamp is configured to couple the hose with the pipe; a flange coupled to the second end of the cylindrical pipe; and a cladding layer coupled to the interior surface of the pipe, wherein the cladding layer includes an abrasion-resistant metal material wherein the cylindrical pipe of the first fitting is inserted into a first end of the hose.

Aspect 19 can include or use, or can optionally be combined with the subject matter of Aspect 18, to optionally include or use comprising a second fitting including: a second cylindrical pipe including a first metal material, the pipe including: a first end; a second end; an interior surface defining a cavity; an exterior surface, the exterior surface defining a perimeter of the pipe and the perimeter of the pipe does not exceed a diameter of the first end; a groove extending into the exterior surface of the pipe and configured to engage with a clamp, wherein the clamp is configured to couple the hose with the pipe; a flange coupled to the second end of the cylindrical pipe; and a cladding layer coupled to the interior surface of the pipe, wherein the cladding layer includes an abrasion-resistant metal material; and wherein the cylindrical pipe of the second fitting is inserted into a second end of the hose.

Aspect 20 can include or use, or can optionally be combined with the subject matter of one or any combination of Aspects 18 or 19 to optionally include or use the nozzle, wherein the nozzle is coupled to the flange of the first fitting.

Aspect 21 can include or use, or can optionally be combined with any portion or combination of any portions of any one or more of Aspects 1 through 20 to include or use, subject matter that can include means for performing any one or more of the functions of Aspects 1 through 20, or a machine-readable medium including instructions that, when performed by a machine, cause the machine to perform any one or more of the functions of Aspects 1 through 20.

Each of these non-limiting aspects can stand on its own, or can be combined in various permutations or combinations with one or more of the other aspects.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
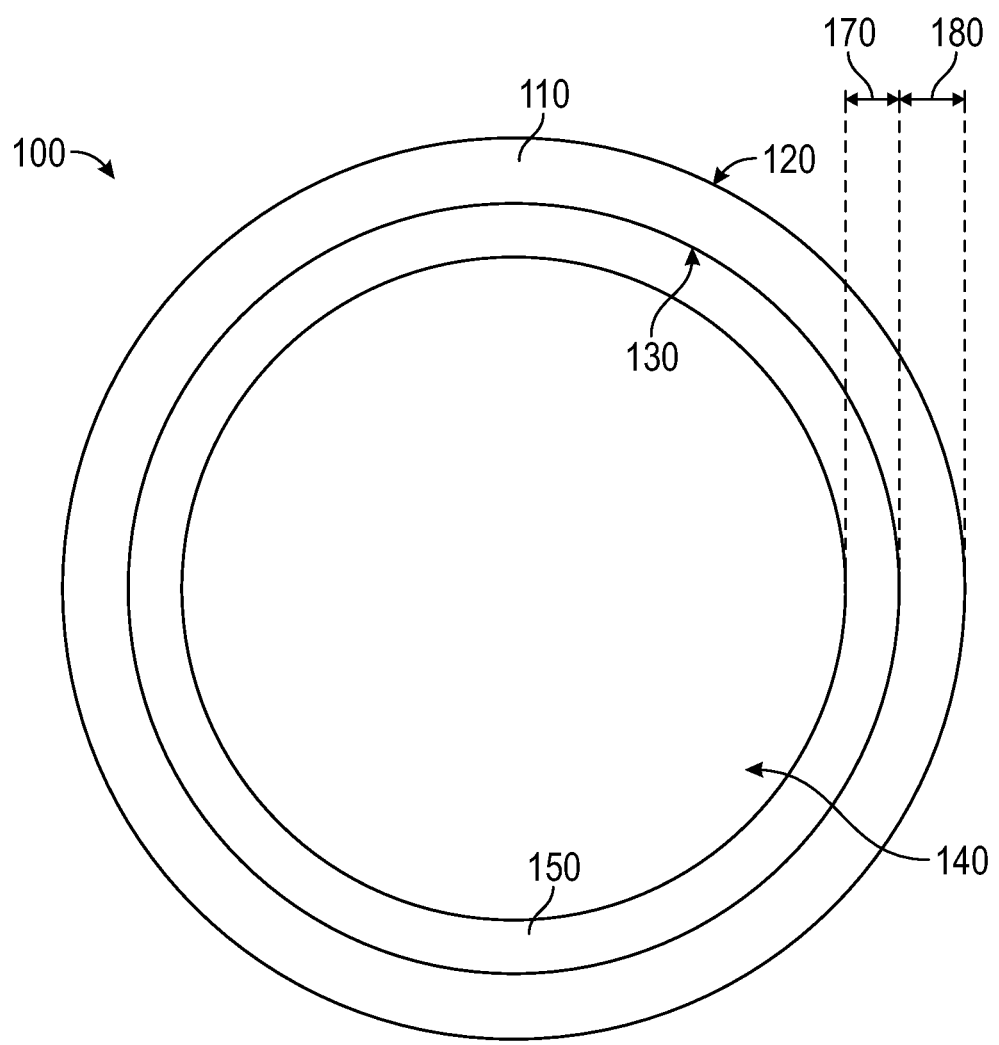
FIG. 1 is a schematic view of a fitting for an excavating apparatus.

FIG. 1 is a schematic view of a fitting 100 for an excavating apparatus. The fitting 100 can include a pipe 110. The pipe 110 can be cylindrical. The pipe 110 can have other cross-sectional shapes (e.g., rectangular, square, polygonal, oval, or the like). The pipe 110 can include a metal material (e.g., steel, stainless steel, or the like). The pipe 110 can include an exterior surface 120 and an interior surface 130. The exterior surface 120 can define a perimeter (e.g., the outer area, outer portion, or the like) of the pipe 110. The interior surface 130 can define a cavity 140. Material can flow through the fitting 100, for example the material can flow through the cavity 140 in the pipe 110.

For example, earthen material (e.g., dirt, mud, sand, rock or the like) can be excavated to remove the material from an area, for instance to excavate the earthen material from an area proximate to utility lines (e.g., electrical, natural gas, water, sewer, telecommunications, or the like). In an example, a hydro-vac apparatus can discharge water and dilute the earthen material into a slurry (e.g., the earthen material can be wet). The slurry can be drawn (e.g., vacuumed, sucked, removed, transmitted, or the like) into a nozzle, and through a hose, through the fitting 100, and into a container. The slurry can wear (e.g., erode, abrade, grind, or the like) components of the hydro-vac apparatus. The slurry can be abrasive, and the slurry can wear components of the excavating apparatus (e.g., the nozzle, the hose, the fitting 100, or the like). The hydro-vac apparatus can excavate dry earthen material. In an example, the hydro-vac apparatus can draw in the dry earthen material, for instance without discharging water and turning the earthen material into a slurry.

The fitting 100 can include a cladding layer 150. The cladding layer 150 can include an abrasion-resistant material. For example, the cladding layer 150 can include (but is not limited to) tungsten, chromium carbide, niobium, or the like (or a combination thereof). The abrasion-resistant material can be different than the material of the pipe 110 (e.g., steel, stainless steel, or the like).

The cladding layer 150 can be coupled to the interior surface 130 of the pipe 110 (e.g., with a welding operation, or the like). The cladding layer 150 can help improve the resilience of the fitting 100 to resist wear from flow of material through fitting 100, for example a slurry of earthen material. For instance, rocks, dirt and the like can flow through the cavity 140 and engage (e.g., interact, rub, communicate, or the like) with the cladding layer 150. The cladding layer 150 can be harder than the interior surface 130 of the pipe (or the exterior surface 120 of the pipe 110). The cladding layer 150 can help protect the interior surface 130 of the pipe 110 from wear. For example, the cladding layer 150 can withstand greater abrasive forces than the interior surface 130. Accordingly, the lifespan of the fitting 100 can be improved because the cladding layer 150 can significantly reduce wearing of the pipe 110.

The cladding layer 150 can have a cladding thickness 170. The cladding thickness 170 can be within a range of approximately 0.1 inches to 0.25 inches, however the present subject matter is not so limited. For example, the cladding thickness 170 can be less than 0.1 inches or greater than 0.25 inches. The pipe 110 can have a pipe thickness 180. The pipe thickness 180 can be within a range of approximately 0.125 inches to 0.250 inches, however the present subject matter is not so limited. For instance, the pipe thickness 180 can be less than 0.125 inches or greater than 0.250 inches.

In an example, the cladding layer 150 can be coupled to the pipe 110 with a welding operation. Heat generated by the welding operation may be dispersed, for example to reduce deformation (e.g., warping, bending, fracturing, burn through, or the like) of the pipe 110 during the welding operation. Dispersing heat generated during the welding operation can facilitate reducing a thickness of the pipe 110. Accordingly, the weight of the fitting 100 (or other components of an excavating apparatus including the cladding layer 150) can be reduced. Reducing weight (or thickness) of the components of an excavating apparatus can decrease costs associated with the components (e.g., because the pipe 110 can have a reduced thickness, thereby reducing material costs for the fitting 100). The reduced weight of the components can facilitate maintenance (or assembly) of an excavating apparatus, for instance because the components are easier to handle by a single individual during maintenance (or assembly) of the excavating apparatus.

The cladding layer 150 can be applied with suitable techniques to distribute heat, to allow usage of a pipe of a lesser thickness. Accordingly, a thickness of the pipe 110 can be reduced, while having an extended lifetime provided by the cladding layer 150. Thus, weight of the fitting 100 can be reduced, and for instance costs associated with manufacturing the fitting 100 can be reduced (e.g., due to reduced material costs associated with the thickness of the pipe 110 being reduced).

Figure 2:
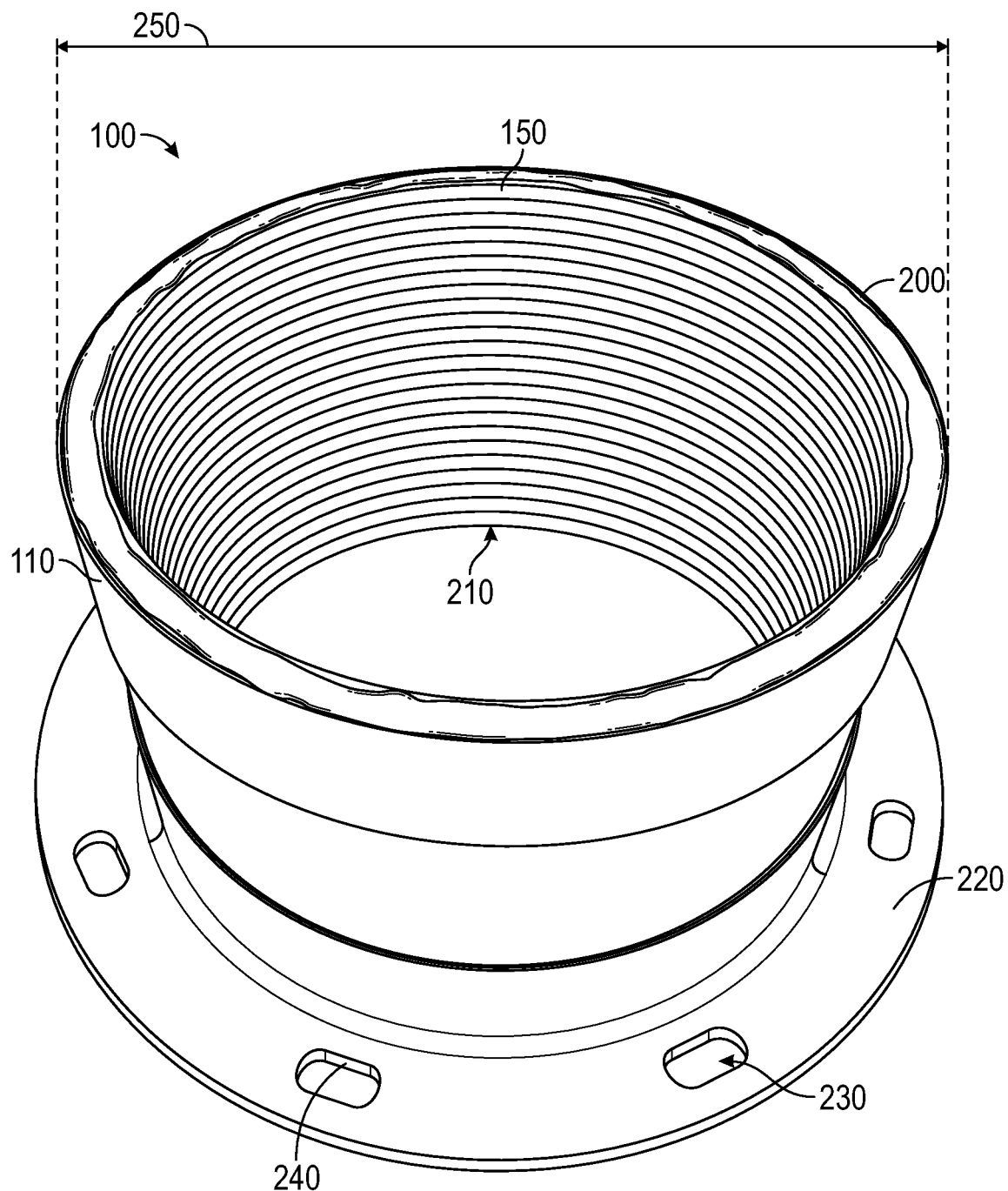
FIG. 2 is a perspective view of the fitting of FIG. 1.

FIG. 2 is a perspective view of the fitting 100 of FIG. 1. The pipe 110 can include a first end 200 and a second end 210. The pipe 110 can extend between the first end 200 and the second end 210. The cladding layer 150 can be coupled to the pipe 110 (e.g., the interior surface 130, shown in FIG. 1), and the cladding layer 150 can extend between the first end 200 and the second end 210 of the pipe 110. The cladding layer 150 can extend partially between the first end 200 and the second end 210. The cladding layer 150 can be coupled to the first end 200 of the pipe 110. The cladding layer 150 can be coupled to the second end 210 of the pipe 110.

The fitting 100 can include a flange 220, and the flange 220 can be coupled to the pipe 110, for instance the flange 220 can be coupled to the second end 210 of the pipe 110. The flange 220 can define at least one through-hole 230. For example, the flange 220 can include a wall 240 that defines the through-hole 230. The through-hole 230 can help facilitate coupling the fitting 100 with additional components of an excavating apparatus, for example a nozzle (e.g., an aluminum tube) or a boom of an excavating apparatus. The flange 100 can facilitate coupling a hose (e.g., a polyurethane lined vacuum hose, or the like) to other components of the excavating apparatus. For instance, a first fitting 100 can be inserted into a first end of the hose, and a second fitting 100 can be inserted into a second end of the hose. A clamp can be coupled to the hose, for example to compress the hose against the fitting 100 and secure the hose to the fitting 100. A fastener (e.g., screw, bolt, or the like) can be inserted into the through-hole 230, and the fastener can couple the flange 220 to additional components (e.g., another fitting 100 or a nozzle).

The first end 200 of the pipe 110 can have a first diameter 250. The exterior surface 120 can define a perimeter of the pipe 110. Optionally, the perimeter of the pipe 110 does not exceed the first diameter 250. For example, the first end 200 can be the largest diameter portion of the pipe 110. The pipe 110 can have the first diameter 250 along a length of the pipe, for instance between the first end 200 and the second end 210. The first diameter 250 can be less than 12 inches, however the present subject matter is not so limited. For example, the first diameter 250 can be within a range of approximately 6 inches to 12 inches (e.g., 8 inches, 7.95 inches, 6.5 inches, or the like).

Configuring the pipe 110 to have the first diameter 250 can help facilitate coupling the fitting 100 with a hose. For instance, if the diameter of the pipe 110 does not exceed the diameter of the first end 200 (e.g., the first diameter 250) the fitting 100 can be easier to insert into the hose. In contrast, the fitting 100 can include a protrusion extending from the exterior surface 120. The protrusion can increase the coupling forces (e.g., friction, or the like) between the pipe 110 and the hose. However, inserting the pipe 110 into the hose, and locating the protrusion within the hose, can be difficult. Configuring the pipe 110 to have the first diameter 250 can help facilitate coupling the fitting 100 with a hose.

Figure 3:
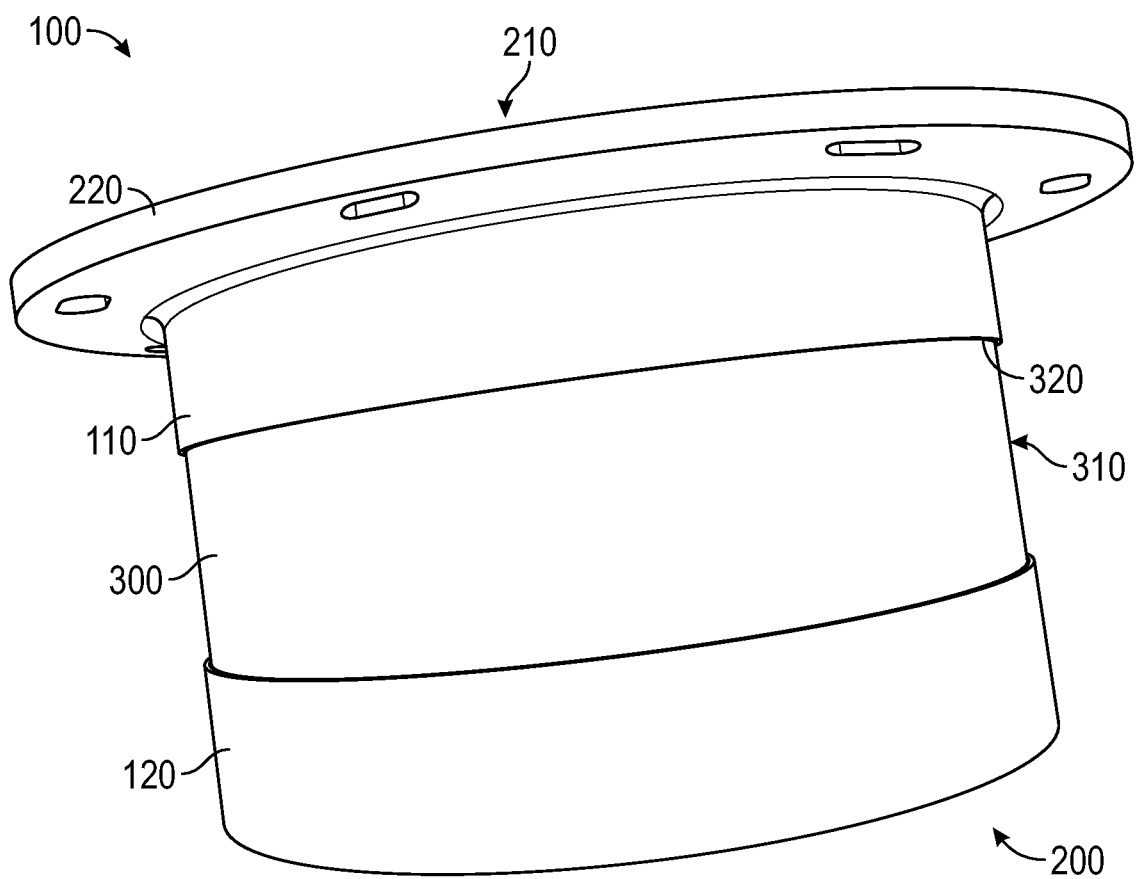
FIG. 3 is a side view of the fitting of FIG. 1.

FIG. 3 is a side view of the fitting 100 of FIG. 1. The fitting 100 can include a groove 300. For example, the groove 300 can extend into the exterior surface 120 of the pipe 110. The groove 300 can be located between the first end 210 and the second end 210 of the pipe. For instance, the groove 300 can be located in a central section 310 of the pipe 110. The diameter of the pipe 110 proximate the groove 300 can be less than the first diameter 250 (shown in FIG. 2). Accordingly, the pipe 110 can have the first diameter 250 in sections outside of the groove 300.

The groove 300 can facilitate coupling the fitting 100 with other components of an excavating apparatus, for instance a hose. For example, the fitting 100 can be inserted into an end of the hose. A clamp (e.g., hose clamp, ring clamp, spring clamp, or the like) can be located around an exterior of the hose. The clamp can be located in a section of the hose proximate to the groove 300. The clamp can compress the hose into the groove 300. Compressing the hose into the groove 300 can improve the coupling forces between the hose and the fitting 100. The clamp can engage with the groove 300 (with the hose therebetween) to inhibit the translation (e.g., sliding, displacement, or the like) of the hose relative to the fitting 100. For example, the clamp can engage with a groove wall 320 of the groove 300. The engagement of the clamp with the groove wall 320 can inhibit the translation of the hose relative to the fitting 100, for example to prevent the fitting 100 from separating from the hose.

As described herein, the cladding layer 150 (shown in FIG. 2) can be coupled to the pipe 110. The cladding layer 150 can help facilitate the inclusion of the groove 300 in the pipe 110. For example, the groove 300 can extend into the exterior surface 120, and can reduce the thickness of the pipe 110. The cladding layer 150 can protect the pipe 110 in the section of the pipe 110 (e.g., the central section 310) proximate to the groove 300. For instance, the groove 300 can weaken the central section 310 of the pipe 110, for example when material flowing through the fitting 100 wears the pipe 110. The cladding layer 150 can help inhibit the wearing of the pipe 110 in the section proximate to the groove 300 and can help increase the resilience of the pipe 110 in the section proximate to the groove 300. Accordingly, the pipe 110 can include the groove 300 without diminishing the resilience of the pipe 110 because the cladding layer 150 inhibits wear of the interior surface 130 (shown in FIG. 1) of the pipe 110.

Figure 4:
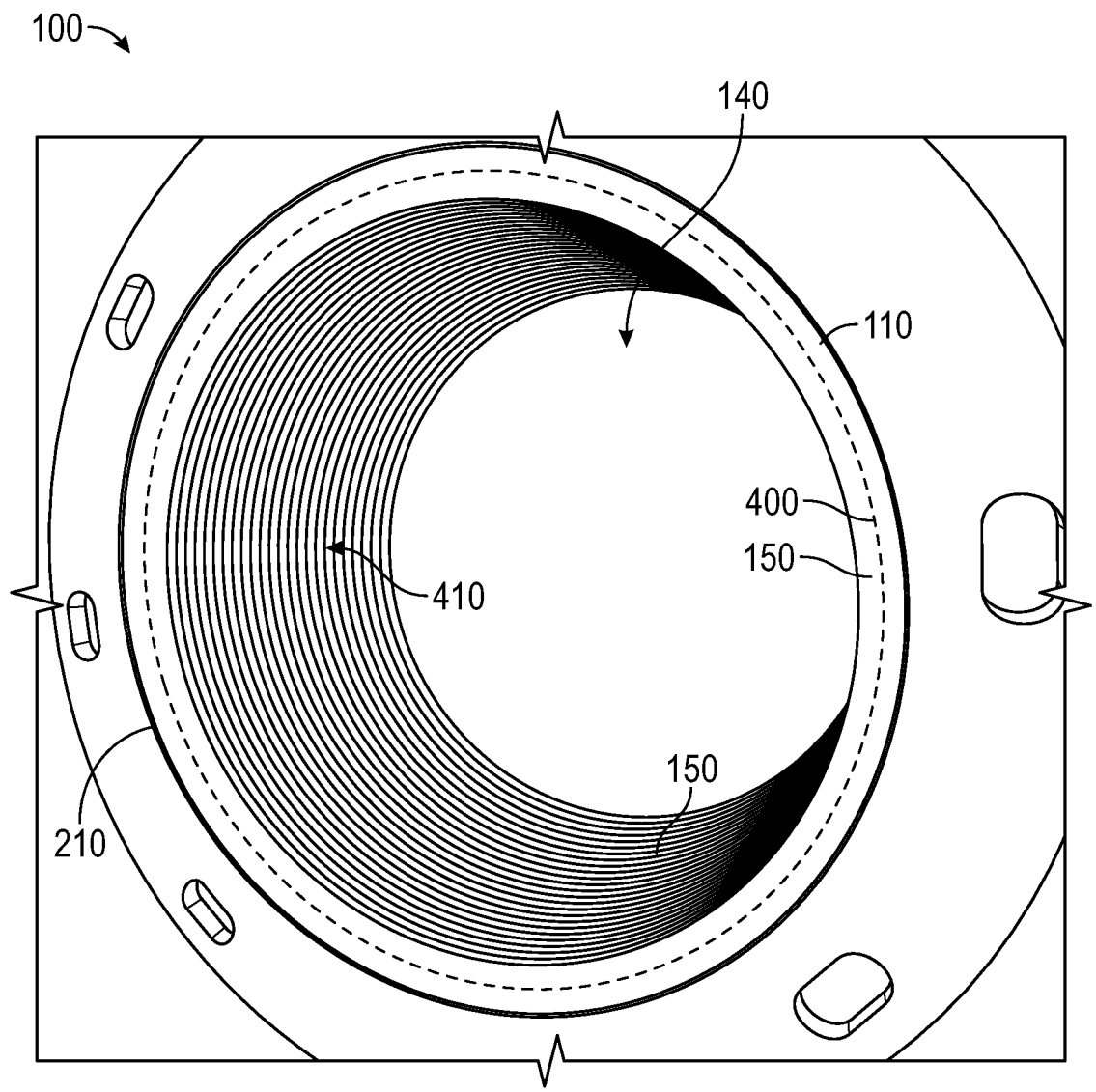
FIG. 4 is a detailed view of the fitting of FIG. 1.

FIG. 4 is a detailed view of the fitting 100 of FIG. 1. As described herein, the cladding layer 150 can be coupled to the pipe 110, for instance with a metallurgical bond. For example, a seam 400 can be observable between the pipe 110 and the cladding layer 150. In an example, the seam 400 can be observable by one or more operations, including (but not limited to) observation with the eye, microscopic examination, cross-sectioning, or through a non-destructive evaluation operation (e.g., x-ray, or the like). The cladding layer 150 can penetrate into the interior surface 130 (shown in FIG. 1) of the pipe 110. For example, the cladding layer 150 can be welded to the pipe 110, and the cladding layer 150 can diffuse into the pipe 110. For instance, the cladding layer 150 can be coupled to the pipe 110 with a gas-metal arc welding operation, or a submerged arc welding operation, however the present subject matter is not so limited.

The cladding layer 150 can include a plurality of ridges 410. The plurality of ridges 410 can extend into the cavity 140. One or more of the ridges 410 can be continuous around the interior surface 130 (shown in FIG. 1) of the pipe 110. For example, the ridges 410 can have a circular profile (or a semicircular profile, or the like), and the circular profile of the ridges 410 can correspond to (e.g., mimic, follow, replicate, or the like) a circular profile of the pipe 110. The ridges 410 can corrugate the pipe 110, for example to provide a textured surface to the interior surface 130 of the pipe 110.

Figure 5:
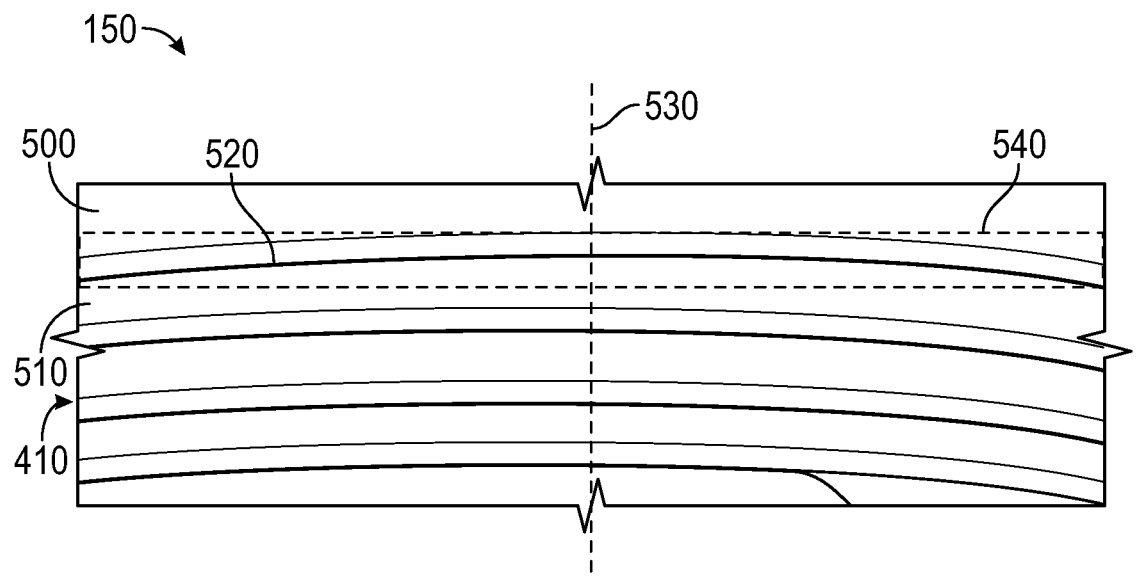
FIG. 5 is a detailed view of a cladding layer.

FIG. 5 is a detailed view of the cladding layer 150. As described herein, the cladding layer 150 can include a plurality of ridges 410. For example, the plurality of ridges 410 can include a first ridge 500 and a second ridge 510. A furrow 520 can be located between the ridges 410. The ridges 410 can have a greater thickness (e.g., extend farther into the cavity 140, shown in FIG. 1) than the furrow 520. The first ridge 500 can be abutted (e.g., touching, in communication, pressed, or the like) against the second ridge 510. Accordingly, and as described herein, the ridges 410 can corrugate the pipe 110, for example the interior surface 130 (shown in FIG. 1).

In an example, the ridges 410 (or furrow 520) are not equally spaced (e.g., a pitch of the ridges 410 may be non-uniform). The ridges 410 (or the furrow 520) may have variations in shape, size, consistency, or the like. For example, because the cladding layer 150 is coupled to the pipe 110 with a welding operation, the shape, size, consistency, or the like of the cladding layer may vary (and a person of ordinary skill in the art would recognize that variation would be present).

The fitting 100 can include a flow axis 530. The flow axis 530 can be the axis that material flows through the fitting 100 (e.g., during an excavation operation, or the like). The flow axis 530 can extend from the first end 200 of the pipe 110 to the second end 210 of the pipe 110 (shown in FIG. 2). The flow axis 530 can be parallel to a length of the pipe 110 (e.g., the flow axis 530 can be parallel to a wall of the pipe 110). FIG. 5 shows the ridges 410 (and the furrow 520) can extend perpendicular to the flow axis 530, however the present subject matter is not so limited. Configuring the ridges to extend perpendicular to the flow axis 530 can reduce wearing of the fitting 100. The ridges 410 (and the furrow 520) can extend parallel to the flow axis 530. The ridges 410 (and the furrow 520) can extend at an angle (e.g., between 0 degrees and 90 degrees, or the like) with respect to the flow axis 530.

The plurality of ridges 410 can include a third ridge 540. The third ridge 540 can be coupled to the first ridge 500 and the second ridge 510. For example, the third ridge 540 can be stacked on top of the first ridge 500 and the second ridge 510. The third ridge 540 can be located between the first ridge 500 and the second ridge 510. The third ridge 540 can be coupled to the furrow 520, and the third ridge 540 can cover the furrow 520 between the ridges 500, 510. Accordingly, the third ridge 540 can extend into the cavity 140 (shown in FIG. 4) at a greater distance than the first ridge 500 or the second ridge 510.

Figure 6:
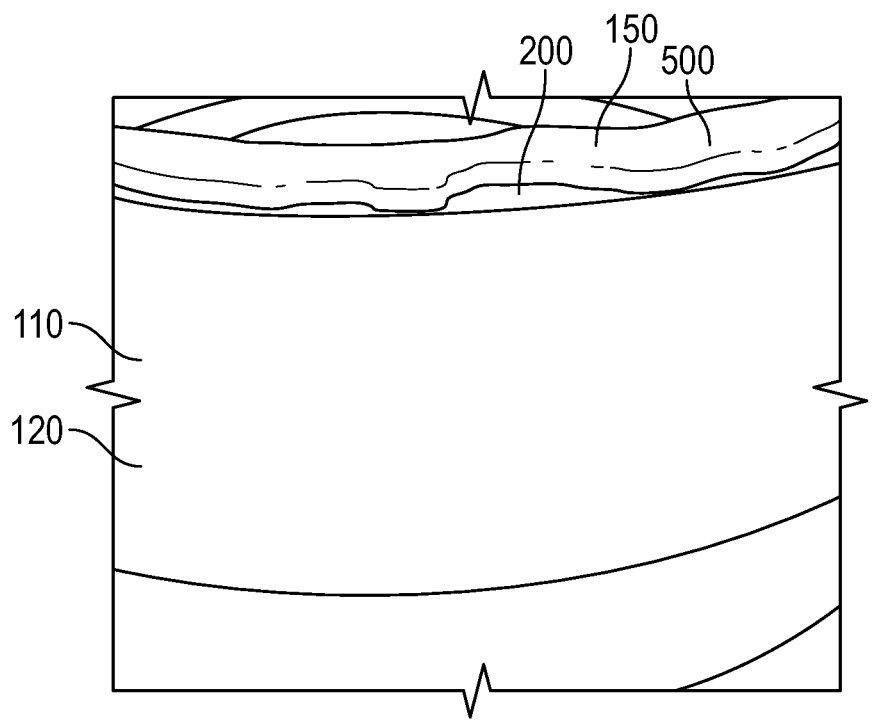
FIG. 6 is another detailed view of the fitting of FIG. 1.

FIG. 6 is another detailed view of the fitting 100 of FIG. 1. The first end 200 of the pipe 110 can be perpendicular to the interior surface 130 (shown in FIG. 1) and/or the exterior surface 120 of the pipe 110. The cladding layer 150 can be coupled to the first end 200 of the pipe 110. For example, the first ridge 500 can be coupled to the first end 200 of the pipe 110. The ridge 500 can extend from the end 200 of the pipe 110. The cladding layer 150 can help inhibit wearing of the end 200 (or the end 210) of the pipe 110. Accordingly, the cladding layer 150 can improve the resilience of the fitting 100.

Figure 7A:
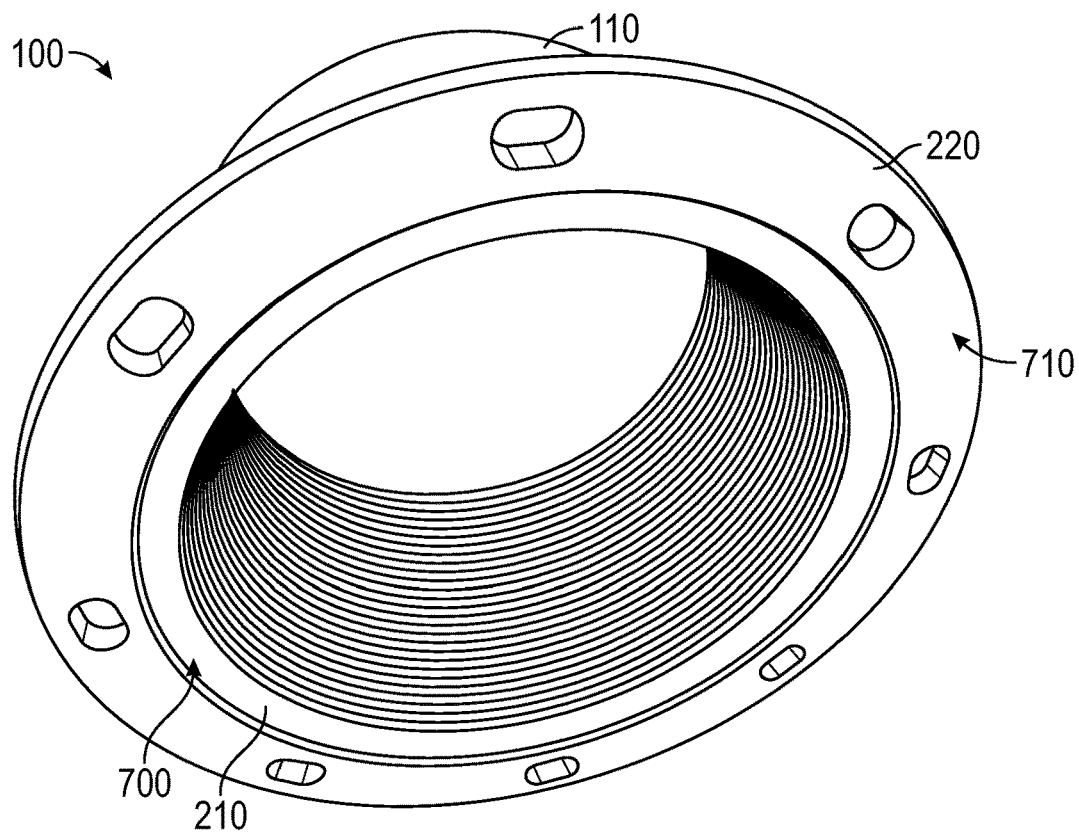
FIG. 7A is an alternate perspective view of the fitting of FIG. 1.
Figure 7B:
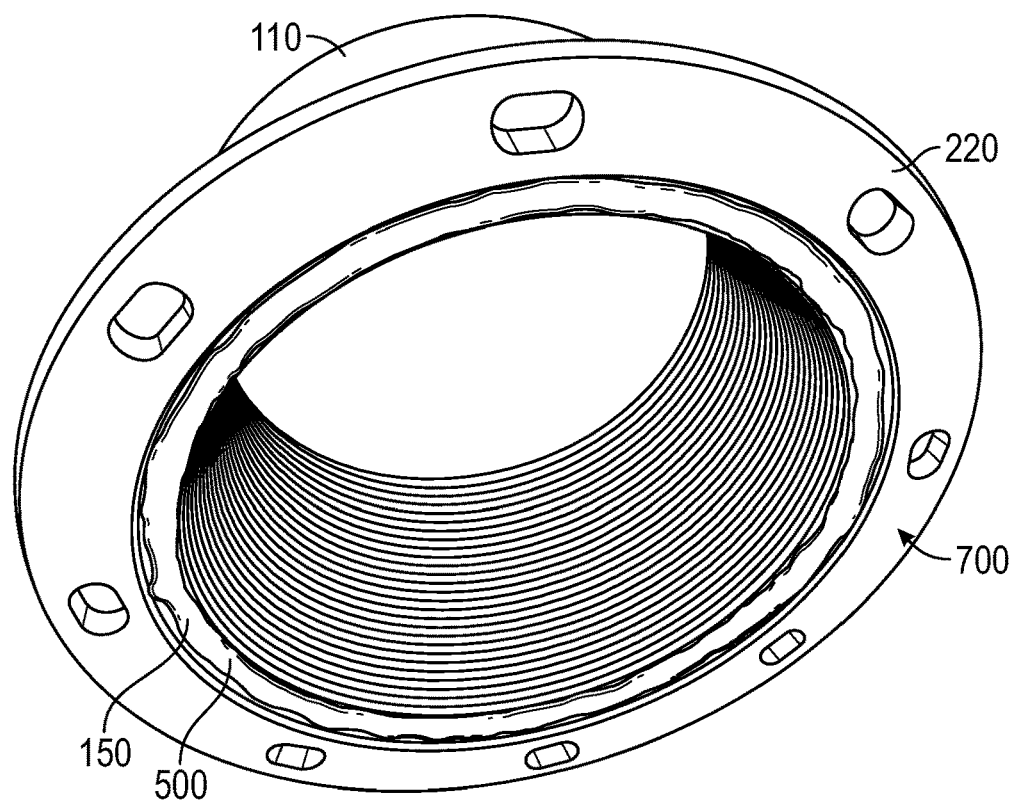
FIG. 7B is another alternate perspective view of the fitting of FIG. 1.

FIG. 7A-7B are alternate perspective views of the fitting 100. The fitting 100 can include the flange 220, and the flange 220 can be coupled to the second end 210 of the pipe 110. As described herein, the cladding layer 150 can be coupled to the second end 210 of the pipe 110 (shown in FIG. 7B). For instance, the fitting 100 can include a channel 700 (shown in FIG. 7A), and the cladding layer 150 can be located in the channel 700 and can be coupled to the second end 210 of the pipe 110. For instance, the channel 700 can be recessed from a mating face 710 of the flange 220. The flange 220 can be offset from the second end 210 of the pipe 110 to provide the channel 700 (or to facilitate recessing the channel 700 from the mating face 710).

The cladding layer 150 can be coupled to the second end 210 of the pipe 110. For example, the first ridge 500 can be located in the channel 700, and the first ridge 500 can extend from the second end 210 of the pipe 110. Because the channel 700 can be recessed from the mating face 710 of the flange 220, the first ridge 500 can be recessed from the mating face 710. The first ridge 500 can be coplanar (e.g., even, flat, flush have a similar elevation, or the like) with the mating face 710 of the flange 220.

In an example, locating the first ridge 500 in the channel 700 can facilitate coupling the mating face 710 of the flange 220 with other components of an excavating apparatus. For instance, the fitting 100 can correspond to the first fitting 100A (shown in FIG. 8). The first fitting 100A can couple with the second fitting 100B (shown in FIG. 8). The mating face 710 of the first fitting 100A can interface with the mating face 710 of the second fitting 100B. Accordingly, the fittings 100A, 100B can be coupled together, for example to provide a seal between the fittings 100A, 100B and facilitate suction of material through the fittings 100A, 100B. Thus, locating the first ridge 500 in the channel 700 can facilitate the interface of the mating face 710 with other components of an excavating apparatus.

In some examples, when the fitting 100 is coupled with the other components of the excavating apparatus, the fitting 100 can be misaligned with the other components. For example, the first fitting 100A can be misaligned with the second fitting 100B. Because material can flow through the other components and the fitting 100, the material can wear the second end 210 (or the first end 200) of the pipe 110 as it flows through the fitting 100 due to the misalignment. The cladding layer 150 (including the first ridge 500) can reduce wearing of the second end 210 of the pipe 110, for example because the fitting 100 is misaligned with the other components of the excavating apparatus. Accordingly, the lifespan of the fitting 100 is enhanced because wearing of the end 210 is reduced by the cladding layer 150.

Figure 8:
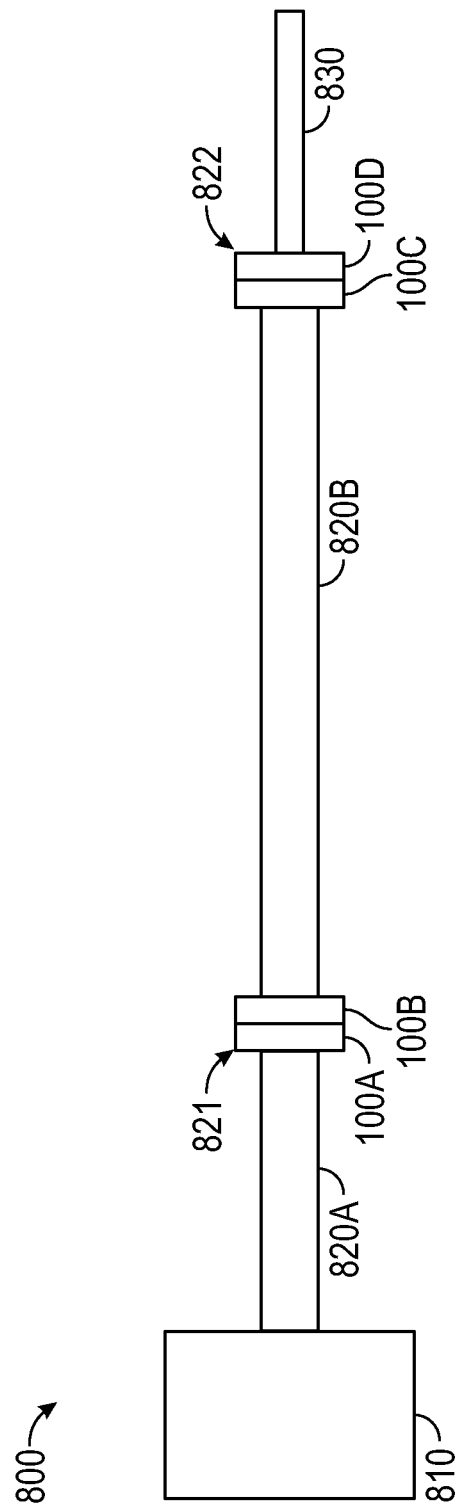
FIG. 8 is a schematic view of an example of an excavating apparatus.

FIG. 8 is a schematic view of an excavating apparatus 800. The excavating apparatus 800 can be a hydro-vac apparatus. The apparatus 800 can be mounted to a vehicle (e.g., a truck, trailer, prime mover, or the like). The apparatus 800 can be utilized to excavate earthen material. For example, the apparatus 800 can remove earthen material from the ground, and can expose a utility (e.g., electrical, natural gas, water, sewer, telecommunications, or the like) line.

The apparatus 800 can include a vacuum pump 810. The vacuum pump 810 can supply a suction force to a hose, for example a first hose 820A or a second hose 820B. The vacuum pump 810 can facilitate drawing material into the excavating apparatus 800 (e.g., during an excavating operation, or the like). The hose 820A can be coupled to the vacuum source 810. A first fitting 100A can be coupled to the hose 820A. For example, the fitting 100A can be inserted into the hose 820A and the hose 820A can be clamped to the fitting 100A. A second fitting 100B can be coupled to the second hose 820B, for example the fitting 100B can be coupled to a first end 821 of the hose 820A. The fittings 100A, 100B can be coupled together, for instance with a fastener (e.g., by inserting a bolt through the through-hole 230 in the flange 220, shown in FIG. 2). A third fitting 100C can be coupled with the second hose 820A, for example the fitting 100C can be coupled to a second end 822 of the hose 820B.

The apparatus 800 can include a nozzle 830. A fourth fitting 100D can be coupled with the nozzle 830. The fittings 100C, 100D can be coupled together, for example with a fastener. The vacuum source 810 can apply a suction force to the hoses 820A, 820B and the nozzle 830. Accordingly, earthen material can be sucked into the apparatus 800 through the nozzle 830 and the hoses 820A, 820B. The fittings 100A, 100B, 100C, 100D can include the cladding layer 150 (shown in FIGS. 1-7B). The earthen material can engage with the fittings 100A, 100B, 100C, 100D and the cladding layer 150 can inhibit wearing of the fittings 100A, 100B, 100C, 100D. The nozzle 830 can include the cladding layer 150 (e.g., the cladding layer 150 can be coupled to an interior surface of the nozzle 830).

Figure 9:
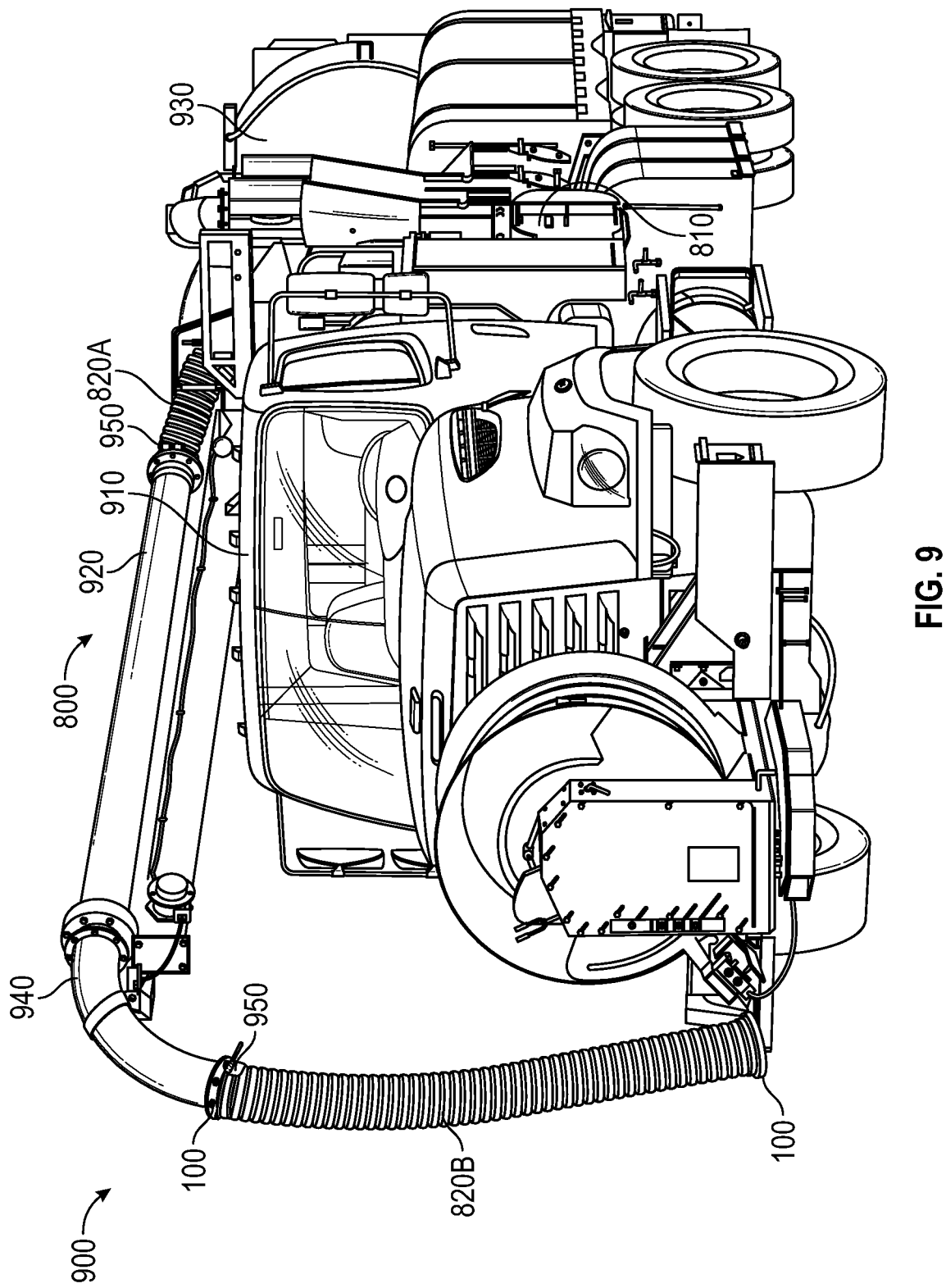
FIG. 9 is a perspective view of an excavating system.

FIG. 9 is a perspective view of an excavating system 900. The excavating system 900 can include the excavating apparatus 800. As described herein, the excavating apparatus 800 can be coupled to a vehicle 910 (e.g., a truck, trailer, prime mover, or the like). The vehicle 910 can facilitate transportation of the excavating apparatus 800.

The excavating apparatus 800 can include a boom 920. The boom 920 may be articulated (e.g., translated, moved, manipulated, extended, contracted, rotated, swung, or the like). For example, the boom 920 can be articulated to position the hose 820B (or the nozzle 830, shown in FIG. 8) proximate to an excavation site. Accordingly, the boom 920 enhances the functionality of the excavating apparatus 800, for example by facilitating an excavation operation at a excavation site that is remote from the excavating apparatus 800 (or the excavating system 900).

The hose 820A may be coupled to the boom 920. For example, the fitting 100 can facilitate coupling the hose 820A to the boom 920. The hose 820A can facilitate articulation of the boom 920. In an example, the hose 820A can be coupled to a container 930 (e.g., a tank, reservoir, or the like). The container 930 can receive material that is drawn into the excavating apparatus 800. For example, the container 930 can be coupled to the vehicle 910, and the vacuum source 810 can provide suction to draw material through the excavating apparatus 800 and into the container 930. Because the boom is articulable (and the container 930 is coupled to the vehicle 910) the hose 820A can facilitate the articulation of the boom 920, for instance because the hose 820A (or the hose 820B) is flexible.

In some examples, the excavating apparatus 800 can include an elbow 940. The elbow 940 can provide a transition between the boom and other components of the excavating apparatus 800. In an example, the boom 920 can extend horizontally, and the elbow 940 can provide a transition, for instance to facilitate locating the hose 820B in a vertical orientation. In an example, the elbow 940 can be angled, for instance to provide a 45-degree transition, a 90-degree transition, or the like. The elbow 940 can include the cladding layer 150, for instance to reduce wearing of the elbow 940 (e.g., wearing of the elbow due to flow of material through the elbow 940). The boom 920 can include the cladding layer 150, for example to reduce wearing of the boom 920 due to material flowing through the boom 920.

The fittings 100 can facilitate coupling of components of the excavating apparatus 800 together. For example, the fitting 100 can be inserted into the hose 820B and a clamp 950 can secure the hose 820B to the fitting 100. The fitting 100 can be inserted into the hose 820A (shown in FIG. 8), for example to facilitate coupling the hose 820A with the boom 920 (or coupling the hose 820A with the container 930). Accordingly, the excavating apparatus 800 can include one or more components (e.g., the fitting 100, the boom 920, the elbow 940, or the like) that have a reduced wear rate (and improved lifespan), for instance because the components include the cladding layer 150 that is abrasion-resistant.

Figure 10:
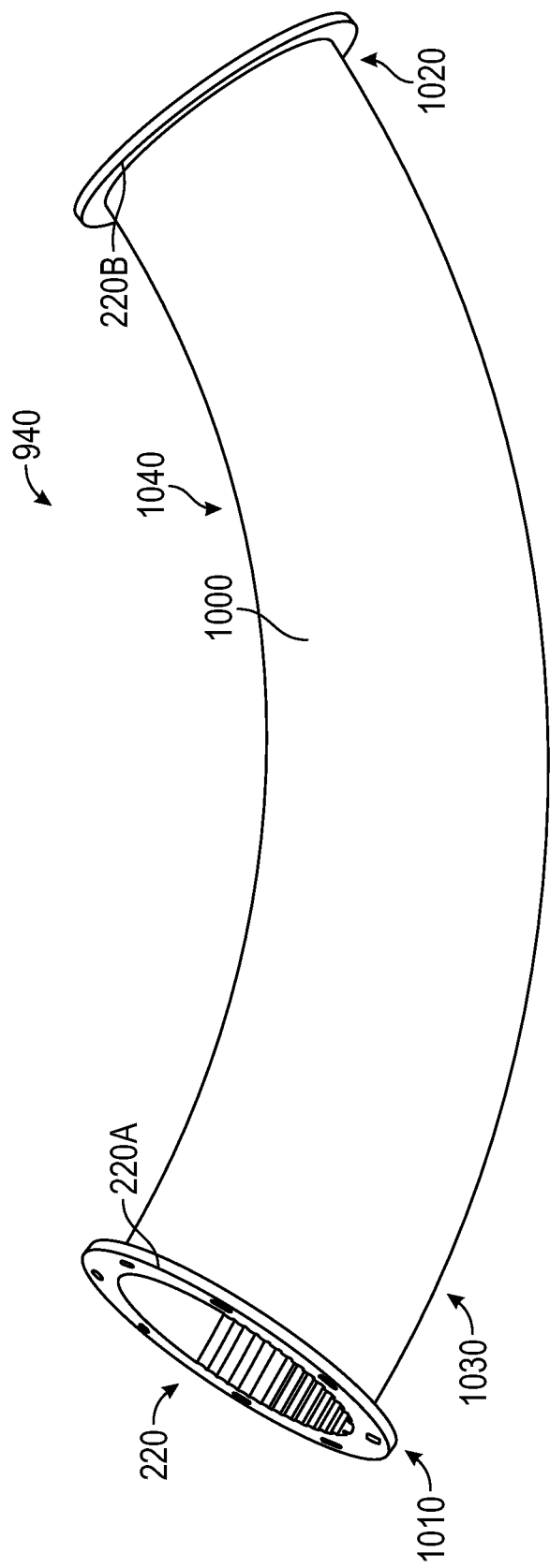
FIG. 10 is a perspective view of an example of an elbow.

FIG. 10 is a perspective view of an example of the elbow 940. The elbow 940 can be similar to the fitting 100. For instance, the elbow 940 can include the cladding layer 150 (shown in FIG. 1). The elbow 940 can provide a transition between components of the excavating apparatus 800 (shown in FIG. 8), or the excavating system 900. For instance, the elbow 940 can facilitate locating the hose 820B in a vertical (or substantially vertical) orientation. The elbow 940 can include a curved pipe 1000. The elbow 940 can include the pipe 110 (shown in FIG. 1).

The curved pipe 1000 can be similar to the pipe 100. In an example, the pipe 110 can be bent to provide the curved pipe 1000. Accordingly, the curved pipe 1000 can have a radius (e.g., arc, curve, bend, bow, crescent, or the like). In an example, the curved pipe 1000 can have a major (e.g., larger) radius 1030. The curved pipe can have a minor (e.g., smaller) radius 1040. The curved pipe 1000 can include a curved section and a straight section. For instance, the curved pipe 1000 can include a linear section that transitions into a bent section.

The radius of the curved pipe 1000 can facilitate the transition between components of the excavating apparatus 800. For instance, an arc length of the curved pipe 1000 can be variable, for instance to vary an angle between a first end 1010 of the curved pipe 1000 and a second end 1020 of the curved pipe 1000. The arc length of the major radius 1030 can be greater than the arc length of the minor radius 1040. Accordingly, the ends 1010, 1020 can be offset at an angle with respect to each other. In an example, the angle between the ends 1010, 1020 of the curved pipe 100 can include (but is not limited to) 25 degrees, 32 degrees, 45 degrees, 90 degrees, or the like.

The elbow 940 can include one or more of the flange 220. For example, a first flange 220A can be coupled to the first end 1010 of the curved pipe 1000. A second flange 220B can be coupled to the second end 1020 of the curved pipe 1000. The flanges 220A, 220B can facilitate coupling the elbow 940 with other components of the excavating apparatus 800 (or the excavating system 900). In an example, the flange 220A of the elbow 940 can be coupled to the flange 220 of the fitting 100 (shown in FIG. 2).

Figure 11:
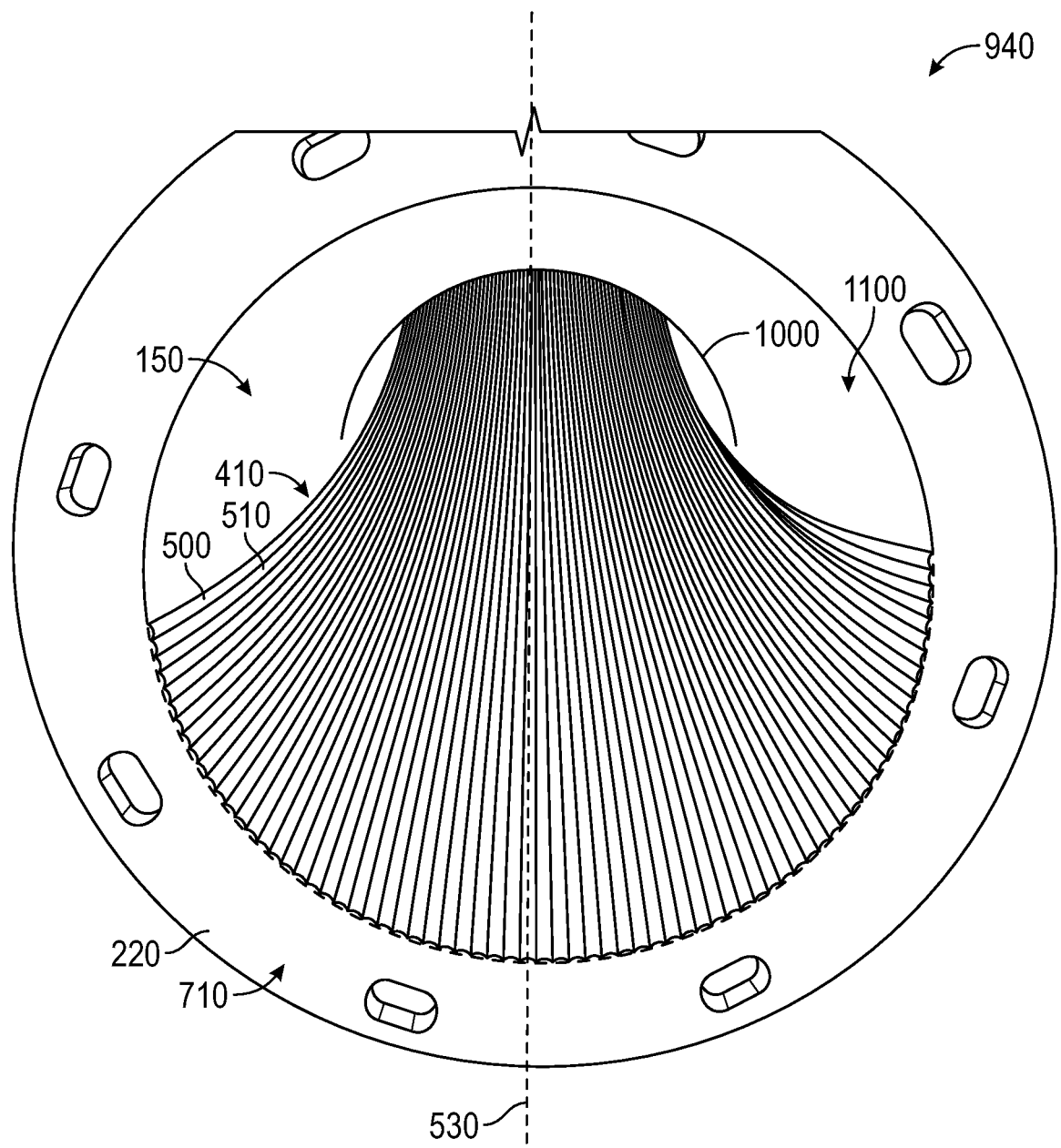
FIG. 11 is an end view of the elbow of FIG. 10.

FIG. 11 is an end view of the elbow 940. As described herein, the elbow 940 can be similar to the fitting 100 (shown in FIG. 1). For example, the elbow 940 can include the cladding layer 150. For instance, the cladding layer 150 can be coupled to the curved pipe 1000. The elbow 940 can include the one or more ridges 410. The ridges 410 can extend parallel to the flow axis 530 of the elbow 940. In an example, the first ridge 500 can be coupled to the curved pipe 1000, and the second ridge can be coupled to the curved pipe 1000. The ridges 500, 510 can extend parallel to the flow axis 530 of the elbow 940. The ridges 410 can be coplanar (e.g., even, flat, flush have a similar elevation, or the like) with the mating face 710 of the flange 220.

The cladding layer 150 can be coupled to a portion of the curved pipe 1000. For instance, the cladding layer 150 can be coupled to the interior surface 1100 of the curved pipe 1000. A portion of the interior surface 1100 can be exposed, for example where the cladding layer 150 is not coupled to the interior surface 1100. In some examples, portions of the curved pipe 1000 are not exposed to wear at a same rate as other portions of the curved pipe 1000. For example, the cladding layer 150 can be coupled to a portion of the interior surface 1100 corresponding to the major radius 1030 of the curved pipe 1000. The cladding layer 150 can be coupled to a portion of the interior surface 1100 corresponding to the minor radius 1040 of the curved pipe 1000. Coupling the cladding layer 150 portions of the curved pipe 1000 (or the pipe 110) that experience greater wear can enhance the lifetime of the elbow 940 (or the fitting 100), for example while minimizing costs associated with manufacturing the elbow 940 (or the fitting 100). Coupling the cladding layer 150 portions of the curved pipe 1000 (or the pipe 110) that experience greater wear can enhance the lifetime of the elbow 940 (or the fitting 100), for instance while minimizing weight of the elbow 940 (or the fitting 100).

VARIOUS NOTES

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An elbow fitting, the fitting comprising:
   a pipe extending between a first end portion and a second end portion, the pipe having a curved cylindrical shape, and the pipe including:
   an interior surface defining a cavity;
   an exterior surface defining a radial perimeter of the pipe that does not exceed a diameter of the first end portion;
   a flange coupled to the first end portion
   a cladding layer welded to the interior surface of the pipe, wherein the cladding layer includes an abrasion-resistant metal material and the cladding layer is welded in correspondence with active dispersion of heat from the pipe; and
   wherein a thickness of a wall of the pipe is within a range of approximately 0.125 inches and 0.250 inches.

2. The fitting of claim 1, wherein the cladding layer includes a plurality of ridges that extend into the cavity, and the plurality of ridges includes a first ridge and a second ridge.

3. The fitting of claim 2, wherein the first ridge is abutted against the second ridge.

4. The fitting of claim 2, wherein the plurality of ridges extend parallel to a flow axis of the pipe.

5. The fitting of claim 2, wherein the fitting includes a flow axis that extends from the first end portion to the second end portion, and the first ridge and the second ridge extend into the cavity and perpendicular to the flow axis.

6. The fitting of claim 2, further comprising a third ridge, wherein:
   the third ridge is coupled to the first ridge and the second ridge;
   the third ridge is located between the first ridge and the second ridge; and
   the first ridge extends into the cavity at a first distance and the third ridge extends into the cavity at a second distance, wherein the second distance is greater than the first distance.

7. The fitting of claim 1, wherein the first end portion is offset at an angle with respect to the second end portion.

8. The fitting of claim 1, wherein the flange is a first flange and a second flange is coupled to the second end portion.

9. The fitting of claim 1, wherein the abrasion-resistant metal material includes one or more of tungsten, chromium carbide, or niobium.

10. The fitting of claim 1, wherein the flange includes at least one through-hole configured to receive a fastener to couple the fitting with a nozzle.

11. The fitting of claim 1, wherein the diameter of the pipe is 12 inches or less.

12. The fitting of claim 1, wherein a thickness of the cladding layer is within a range of approximately 0.1 inches and 0.250 inches.

13. The fitting of claim 1, wherein the cladding layer penetrates into the interior surface.

14. An elbow fitting, the fitting comprising:
   a pipe extending between a first end portion and a second end portion, the pipe having a curved cylindrical shape, and the pipe including:
   an interior surface defining a cavity; and
   an exterior surface defining a radial perimeter of the pipe, wherein the radial perimeter of the pipe does not exceed a diameter of the first end portion;
   a flange coupled to the first end portion; and
   a cladding layer welded to the interior surface of the pipe, wherein the cladding layer includes an abrasion-resistant metal material, and the cladding layer is applied in correspondence with active dispersion of heat from the pipe during application of the cladding layer to the pipe, and wherein a thickness of a wall of the pipe is within a range of approximately 0.125 inches and 0.250 inches and the cladding layer is applied to the wall of the pipe with a technique that distributes the heat and without deforming the pipe.

15. The fitting of claim 14, wherein the abrasion-resistant metal material includes one or more of tungsten, chromium carbide, or niobium.

16. The fitting of claim 14, wherein a thickness of the cladding layer is within a range of approximately 0.1 inches and 0.250 inches.

17. The fitting of claim 14, wherein the diameter of the pipe is 12 inches or less.

18. The fitting of claim 14, wherein the cladding layer includes a plurality of ridges that extend into the cavity, and the plurality of ridges includes a first ridge and a second ridge.

19. The fitting of claim 18, wherein the first ridge is abutted against the second ridge.

\* \* \* \* \*